No. 629,016. Patented July 18, 1899.
G. W. SOULÉ
COTTON SEED HULLER AND SEPARATOR.
(Application filed Dec. 13, 1897.)

(No Model.) 5 Sheets—Sheet 1.

WITNESSES INVENTOR

No. 629,016. Patented July 18, 1899.
G. W. SOULÉ
COTTON SEED HULLER AND SEPARATOR.
(Application filed Dec. 13, 1897.)
(No Model.)
5 Sheets—Sheet 2.

No. 629,016. Patented July 18, 1899.
G. W. SOULÉ
COTTON SEED HULLER AND SEPARATOR.
(Application filed Dec. 13, 1897.)
No Model. 5 Sheets—Sheet 3.
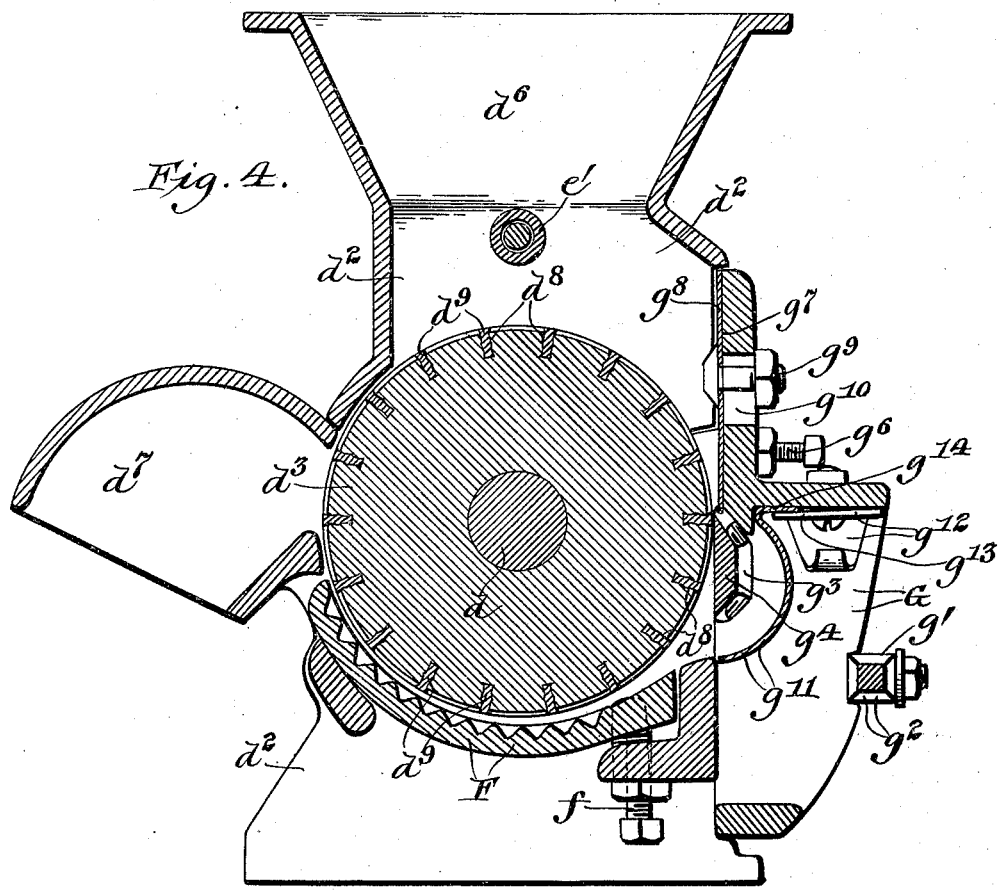
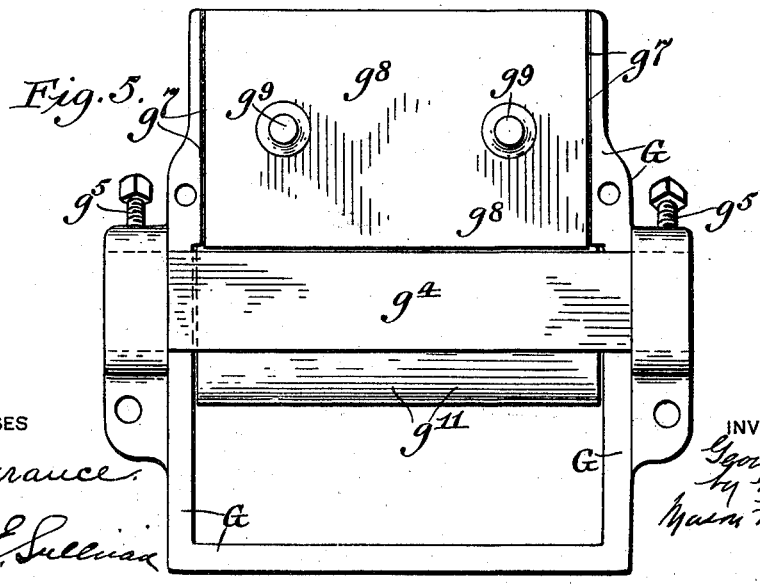
WITNESSES
INVENTOR
George W. Soulé
by his Attys.

No. 629,016. Patented July 18, 1899.
G. W. SOULÉ
COTTON SEED HULLER AND SEPARATOR.
(Application filed Dec. 13, 1897.)
(No Model.) 5 Sheets—Sheet 4.
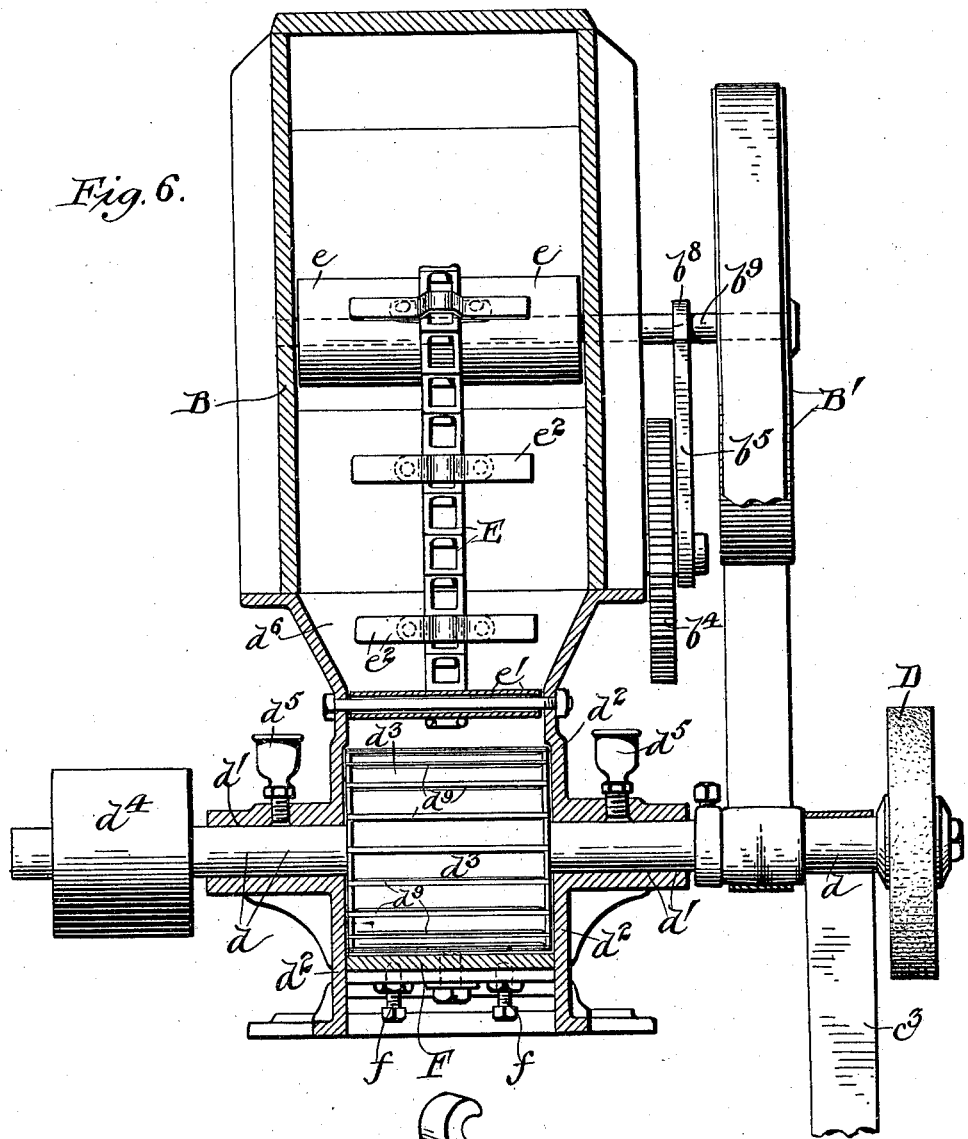
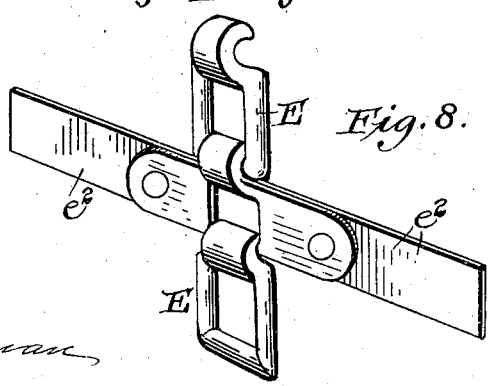
WITNESSES
INVENTOR No. 629,016. Patented July 18, 1899.
G. W. SOULÉ
COTTON SEED HULLER AND SEPARATOR.
(Application filed Dec. 13, 1897.)

(No Model.) 5 Sheets—Sheet 5.

WITNESSES
INVENTOR

UNITED STATES PATENT OFFICE.

GEORGE W. SOULÉ, OF MERIDIAN, MISSISSIPPI.

COTTON-SEED HULLER AND SEPARATOR.

SPECIFICATION forming part of Letters Patent No. 629,016, dated July 18, 1899.

Application filed December 13, 1897. Serial No. 661,681. (No model.)

*To all whom it may concern:*

Be it known that I, GEORGE W. SOULÉ, a citizen of the United States, residing at Meridian, in the county of Lauderdale and State of Mississippi, have invented certain new and useful Improvements in Cotton-Seed Hullers and Separators; and I do hereby declare the following to be a full, clear, and exact description of the invention, such as will enable others skilled in the art to which it appertains to make and use the same.

My invention relates to improvements in cotton-seed hullers and separators; and its object is to produce a machine which will successfully feed the seed to a cutting-blade, cut the hulls from the seed, and separate the same in a very perfect manner.

It consists in certain novel constructions, combinations, and arrangements of parts, as will be hereinafter more fully described and claimed.

Figures 1, 7:
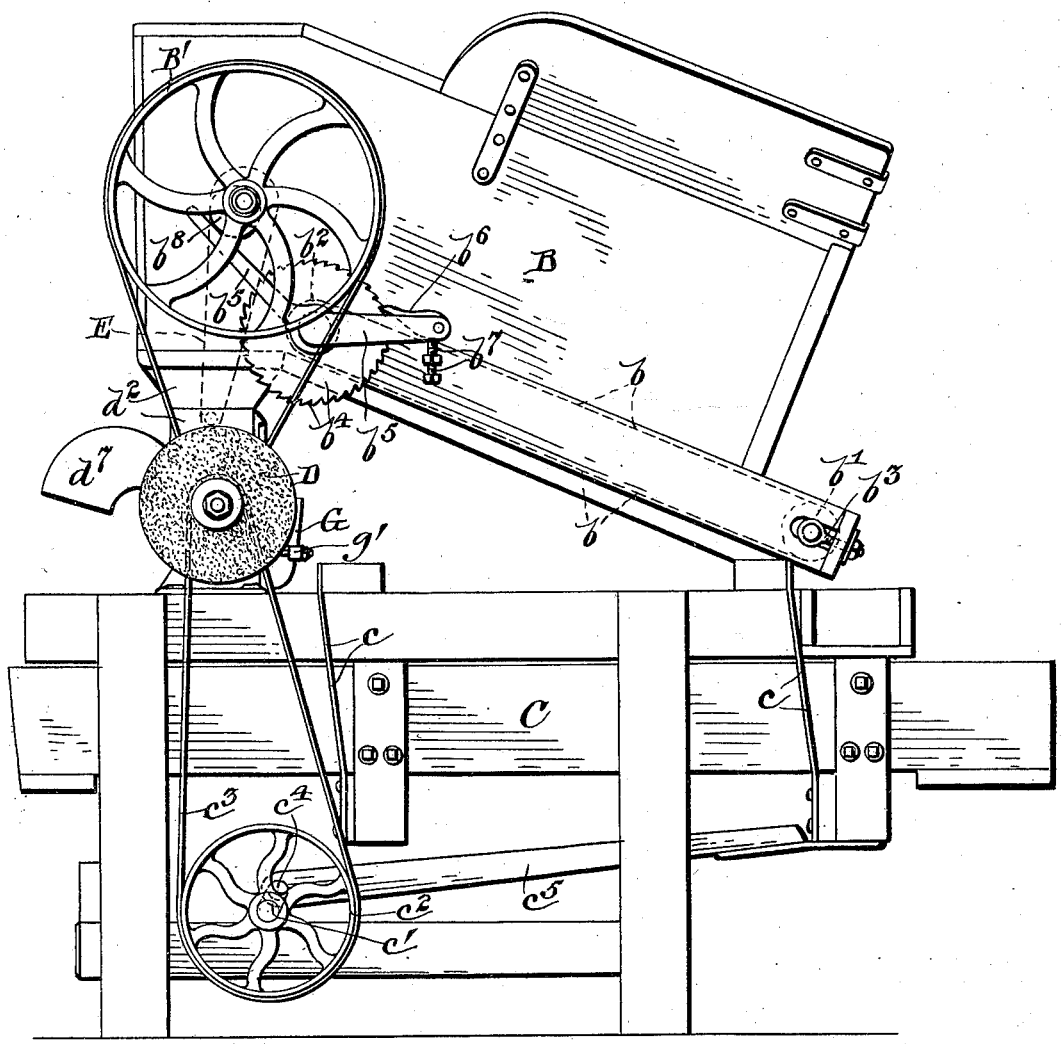
Figure 2:
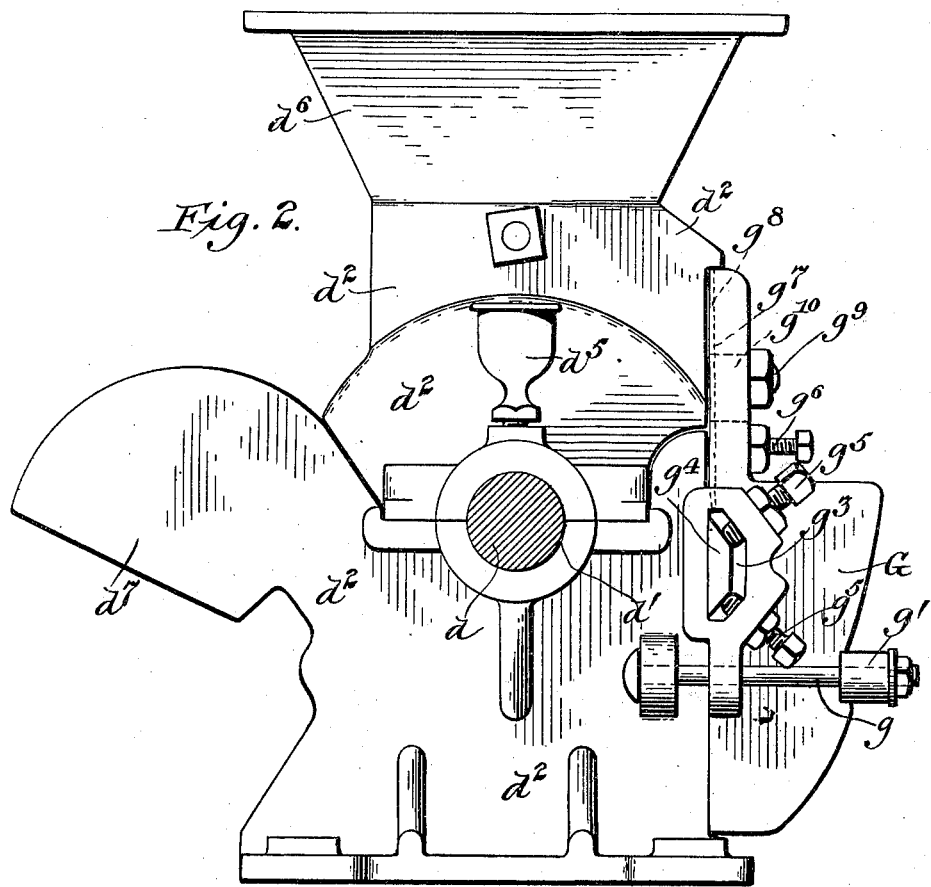
Figure 3:
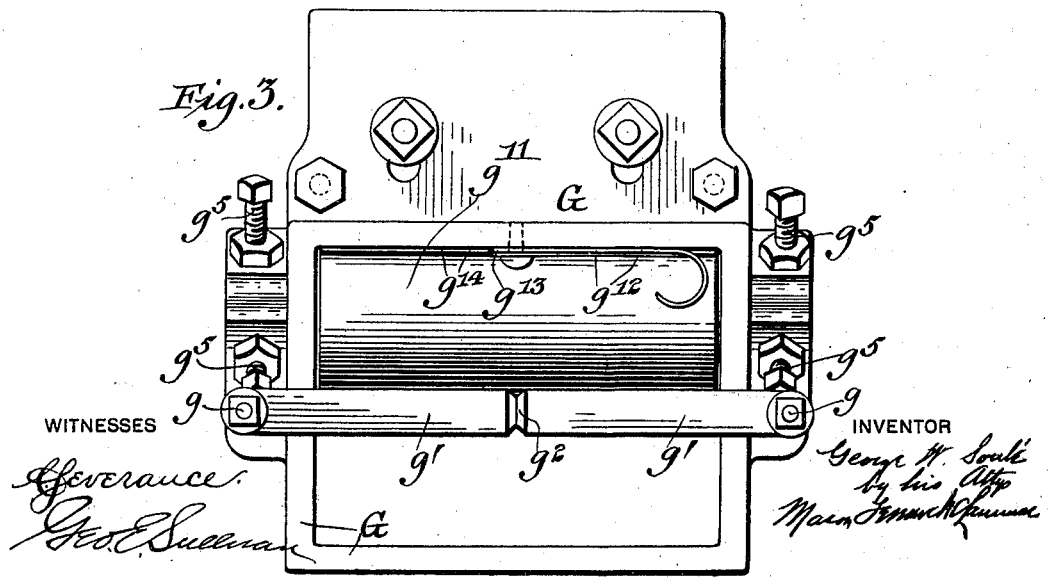
Figure 9:
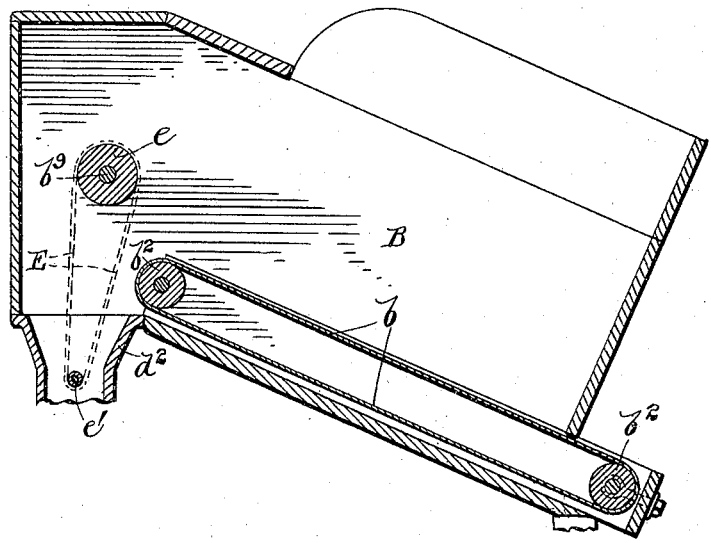
Figure 10:
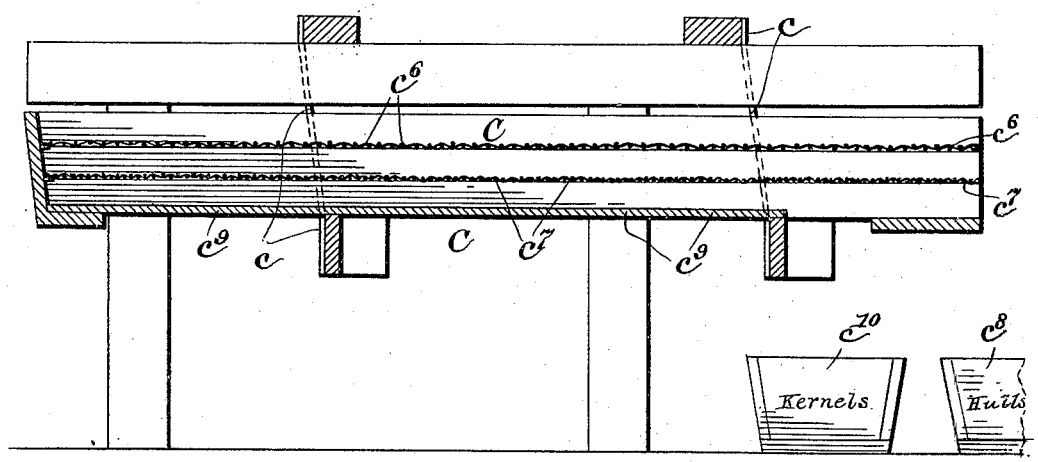
Figure 11:
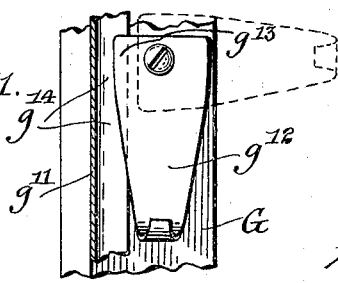

In the accompanying drawings, Figure 1 represents a side elevation of my improved huller and separator. Fig. 2 represents an enlarged side view of the mechanism which forces the cotton-seed against the stationary knife for dividing the seed. Fig. 3 represents an elevation of the portion of the frame carrying the stationary knife. Fig. 4 represents a vertical longitudinal section through the hulling mechanism. Fig. 5 represents a detail view of the adjustable knife. Fig. 6 represents a vertical transverse section through the hulling mechanism. Fig. 7 represents a detail view showing the blade used upon the hulling-cylinder. Fig. 8 represents a detail view of a portion of the feeding-chain for forcing the cotton-seed down into the hulling mechanism. Fig. 9 represents a longitudinal central vertical section through the feed-trough and the feed-box mounted thereon. Fig. 10 represents a central vertical longitudinal section through the separator; and Fig. 11 represents a detail fragmentary view of a portion of the knife-carrying casing, illustrating the means of securing the curved plate in position which operates to return the split seed into the path of the cylinder.

In the drawings representing my improved huller and separator, B is a feed-trough for the same, C a separator combined therewith, and D an emery-wheel. Mounted in the bottom of the feed-trough B is a feeding belt or chain $b$, mounted upon rollers, as $b'$ $b^2$. The roller $b'$ at the lower end of the belt is provided at its ends with adjusting-screws, as $b^3$, by which any slack in the belt or chain may be taken up. The roller $b^2$ is provided with a shaft which extends outside the casing and carries a ratchet-wheel $b^4$. A double-armed lever $b^5$ is also mounted upon the outer end of the shaft of said roller and provided at the end of one arm with an adjustable dog or pawl $b^6$, which is adapted to engage the teeth of the ratchet-wheel $b^4$. The throw of this pawl can be adjusted by means of a screw $b^7$, so as to move a greater or less number of teeth, according as it is desired to move the belt more or less rapidly. The screw $b^7$ is mounted in a lug upon the side of the feed-trough and limits the motion of the arm $b^5$, carrying the pawl $b^6$. The other arm of the lever $b^5$ engages an eccentric, as $b^8$, mounted upon the outer end of the said shaft $b^9$ and which has bearings in the upper end of the feed-trough B. A pulley, as B', is also mounted upon the outer end of the said shaft $b^9$ and is connected by a suitable belting with the running parts of the machine, whereby it is revolved, and as it rotates carries with it the cam $b^8$ upon the shaft $b^9$, the said cam engaging and operating the lever.

In handling cotton-seed experience shows that on account of the lint hanging to the hulls of the said seed they are inclined to mat together and the seeds cannot be fed to a machine with an ordinary hopper or rattler that may be used for other purposes or other grains. The feed-trough is preferably inclined away from the mouth of the hulling mechanism, so that only such seed as are carried up by the belt $b$ will be fed into the hopper. The trough B is made of considerable size, so that a large quantity of cotton-seed may be placed therein and will be preferably fed by the upwardly-inclined belt $b$ without attention. By the use of an inclined belt in the feed-trough a uniform amount of cotton-seed will be fed to the huller whether the trough is full or nearly empty. On this account I contemplate using a feeding-chain in addition to the belt $b$. This chain E passes about a roller $e$, mounted upon the shaft $b^9$, and extends downwardly and about a roller, as $e'$, mounted just above the hulling-cylinder. While this chain may be made in the form of an ordinary sprocket-chain, yet I prefer to secure to it at intervals laterally-extending arms, as $e^2$ $e^2$, which greatly assist in carrying the cotton-seed downwardly. The chain E extends from the feed-trough down into the main hopper of the huller, the roller $e'$ being mounted in the throat of the said huller. Below the roller $e'$ the main shaft of the huller, as $d$, is mounted in suitable bearings, as $d'$, formed in the side of the huller-casing $d^2$. This shaft $d'$ has secured upon its central portion the hulling-cylinder $d^3$, its outer ends passing outside the huller-casing, preferably upon both sides thereof. Upon the one side of the casing a pulley, as $d^4$, may be secured to engage a driving-belt connected with any source of power. Of course it will be apparent that, if desired, the pulley may be dispensed with and the belt may engage the naked shaft for revolving the same. Upon the other end of the shaft are mounted suitable pulleys for engaging belts to operate the pulley $B'$ upon the shaft $b^9$ in the feed-trough and the mechanism which operates the separator C. I also find it very convenient to mount upon an end of this shaft $d$ an emery-wheel, as D. This enables me to easily and quickly resharpen the knife of the huller and forms a valuable adjunct to the huller and separator. Suitable oil-cups, as $d^5$, may be mounted upon the bearings $d'$ to lubricate the same. The huller-casing $d^2$ is provided at its upper end with a hopper $d^6$. The lower part of the frame $d^2$ is adapted to be closed upon one side by the knife-holding frame or casing G. The other side of the lower portion of the frame is extended outwardly to form a delivery-chute, as $d^7$. The hulling-cylinder $d^3$ occupies the central space in the main casing $d^2$ and is provided upon its periphery with a series of slots or recesses, as $d^8$. Blades, as $d^9$, are placed in these recesses, their outer edges extending a short distance above the periphery of the cylinder. The novel construction of these blades forms an important part of my invention, and it will be noted upon looking at the drawings that the blades are formed with double concaved surfaces upon each side, they being ground hollow upon two different surfaces on each side. After they are inserted in the recesses $d^8$ the metal of the cylinder is calked in against the body of the blade, thus causing the same to be held in place by means of the dovetailed joint thus formed. By this construction of blade they may be inserted with either edge out, and when worn on one edge may be taken out and inserted with the other edge out. This forms a very desirable construction and one particularly well adapted for carrying the cotton-seed against the knife. The frame G, carrying the knife, is adapted to fit snugly against the side of the casing $d^2$ and is held against the same by means of side bolts, as $g$, which engage lugs upon the side of the frame $d^2$. The outer ends of the bolts $g$ engage holes in the ends of the break-bar $g'$, the said break-bar extending from side to side of the frame G and being provided at the central portion with a deep groove or notched portion, as $g^2$. By this construction any undue strain brought to bear upon the knife or frame carrying the same—as, for instance, by reason of hard substance getting into the huller and being forced against the knife or the frame by means of the hulling-cylinder—the bar $g'$ will break readily under such circumstances and allow the whole frame G to drop out of place, and thereby save the parts intact. The break-bar $g'$ can be cheaply made and a number can be kept on hand to replace the broken ones whenever such a contingency takes place. The frame G is provided upon each side with sockets or recesses, as $g^3$, adapted to receive the ends of the knife $g^4$. The knife is preferably made with beveled upper and lower edges, the upper edge of the said knife being the cutting portion. Set-screws, as $g^5$, are mounted in the frame G and adapted to bear upon the knife $g^4$, so as to adjust it accurately to the desired proximity to the periphery of the hulling-cylinder $d^3$. The frame G may also be adjusted in and out and with respect to the casing $d^2$ by means of adjusting-screws $g^6$. Both the adjusting-screws $g^5$ and $g^6$ are provided with lock-nuts to hold them in their adjusted positions. The upper portion of the frame G is provided with a vertical recess, as $g^7$, which is adapted to receive and hold a gage-plate, as $g^8$, the said gage-plate being used to regulate the space above the knife-edge, through which the divided hulls of the cotton may pass. The gage-plate $g^8$ is preferably ground with square edges top and bottom, so that it may be reversed, the construction thus described providing four square edges, which may be successively presented to engage the material passing over the knife. In the event of these edges becoming dulled by the constant friction with the cotton-seed the gage-plate $g^8$ may be removed at any time and ground again. The gage-plate $g^8$ is held in position in the recess $g^7$ by means of bolts, as $g^9$, which pass through slots, as $g^{10}$, formed in the frame G. These bolts $g^9$ not only hold the gage-plate $g^8$ in position, but by reason of their engagement with the slots $g^{10}$ are adapted to hold the said blade in its different adjusted positions.

A very important feature of my invention consists in allowing the portion of the cotton-seed and their hulls which are cut off by the knife $g^4$ to pass around the knife instead of having to be dragged back again over the edge of the knife, as has been common in hullers made heretofore. This not only dulls the knife very much more rapidly, but otherwise injures the action of the machine. The fact that the cut portion of the cotton-seed are permitted to pass around the knife prevents the dragging action upon the edge thereof, and the centrifugal force with which the seed are carried by the hulling-cylinder causes any grit to be carried beyond the edge of the knife, so that instead of hitting and dulling it the grit is carried beyond the edge of the knife and strikes the beveled portion thereof and operates rather to sharpen it than otherwise. It is desirable to carry the divided portion of the seed which passes around the knife back into the path of the cylinder, and for this purpose I mount a concaved plate, as $g^{11}$, in the casing G, the said plate $g^{11}$ inclosing the knife and returning any substance which passes over it back again into the path of the cylinder. This concaved plate $g^{11}$ may be secured in the frame G in any desired manner, but is preferably held therein by means of a pivoted clamping-plate, as $g^{12}$, the one edge of the said clamping-plate, as $g^{13}$, engaging a flange, as $g^{14}$, upon the upper edge of the said plate. When the hinged plate $g^{12}$ is in its normal position, as seen in Figs. 3 and 4, the flange $g^{14}$ will be clamped between it and a portion of the frame G. When it is desired to loosen and remove the concaved plate $g^{11}$, it is merely necessary to pull the pivoted plate $g^{12}$ outwardly upon its pivotal point, when the said concaved plate can be readily taken out, as the distance between the pivotal point of the said plate and the short end thereof is less than the distance between the said pivotal point and the edge of said concaved plate. I have illustrated in the drawings a concaved beater-plate, as F, seated in the lower portion of the frame $d^2$ immediately below the huller-cylinder $d^3$. This beater-plate is preferably provided with a serrated upper surface, between which and the cylinder the cotton-seed may be further pounded or beaten before passing to the separator. While I have illustrated and described this construction, yet I do not wish to limit myself to the use of the same under all circumstances, as there are many times when it is desired to use the huller without the said beater-plate. The beater-plate is adapted to be adjusted by means of set-screws $f$, so as to bring it closer to the cylinder when desired.

After the cotton-seed have been split or hulled and passed around the cylinder they are adapted to be discharged through the discharge-chute $d^7$ and fall directly into the separator C. This separator may be constructed interiorly in any well-known and desired manner and may be provided with any sort of a screen or perforated plate which will effect the proper separation of the seed from the hulls. As seen in Fig. 10 of the drawings, the separator has an upper screen, $c^6$, and a lower one, $c^7$, of smaller mesh than that of the screen $c^6$. The most of the hulls will be carried off by the screen $c^6$ and discharged at its end into a receptacle, as at $c^8$. The kernels fall through upon the screen $c^7$, but if any hulls pass through the upper screen they are removed thereby, the said lower screen discharging them into the same receptacle $c^8$. The kernels are collected upon the floor $c^9$ and discharged into a receptacle, as at $c^{10}$. The mounting of the said separator upon the frame so as to give a forward feeding motion to the hulled cotton-seed therein forms a novel feature of my invention. As will be seen from the drawings, the separator C is preferably mounted horizontally, and in order to give a forward movement to the contents thereof I have conceived the idea of mounting the said separator upon inclined spring-straps, as $c\,c$, which support the said separator upon the frame of the huller. A shaft, as $c'$, in the lower part of the frame carries a pulley $c^2$, which is connected by means of a belt $c^3$ with the main shaft $d$ of the huller. The shaft $c'$ is provided with a crank portion, as $c^4$, which is connected by means of a pitman, as $c^5$, with a separator C. By this means when the huller is in operation the separator is constantly given a reciprocating movement. I have found by mounting a horizontal separator upon inclined straps, as $c$, that when the said separator is reciprocated, as above described, the movement thus produced by the said separator operates to pitch the cotton-seed upward and forward and then to fall back beneath the same, so that when the cotton-seed drops again it will be at an advanced point in the separator. Suitable troughs or receptacles may be provided to receive the cotton-seed from the separator.

It will be apparent that a cotton-seed huller and separator constructed in accordance with the above-described mechanism will produce a machine which is particularly well adapted for handling cotton-seed and one which will successfully hull and separate the said seed. It will also be apparent that the construction is simple and yet of such a character as to be readily adjusted to suit all circumstances.

Having now described my invention, what I claim as new, and desire to secure by Letters Patent, is—

1. In a huller for cotton-seed, the combination with a hulling-cylinder, of a stationary knife secured at its ends in the frame of the huller so that the seeds split by the knife may pass around both sides of the same and means for collecting the seed below the knife so as to deliver them at the same point, substantially as described.

2. In a huller, the combination with a hulling-cylinder, of a knife mounted in the frame of the huller and in such proximity to the cylinder as to split the cotton-seed forced against it and a plate forming a passage-way around the knife so as to deliver the portions of the seed passing around both sides of the knife into the path of the cylinder again, substantially as described.

3. In a cotton-seed huller, the combination with a stationary knife, of a cylinder having radial blade grooves or slots and adapted to force the cotton-seed against the knife, blades mounted upon the said cylinder, the said blades being provided with double concaved surfaces upon each side, forming ribs thereon whereby they may be firmly calked in place in the grooves of the cylinder, substantially as described.

4. In a cotton-seed huller, the combination of a stationary knife, a hulling-cylinder for carrying the seed against the said knife, a gage-plate mounted above the knife and adapted to present the seed thereto so as to be properly divided by the said knife and means for adjusting the gage-plate to form a larger or smaller opening between it and the cylinder, substantially as described.

5. In a cotton-seed huller, the combination with a stationary knife, a hulling-cylinder for carrying the cotton-seed against the knife, a removable casing forming one side of the huller-frame and carrying the said knife, a gage-plate mounted upon the said casing and adapted to regulate the passage of the seed to the knife and means for adjusting the said gage-plate upon the said casing, substantially as described.

6. In a cotton-seed huller, the combination of a knife, a hulling-cylinder for carrying the cotton-seed against the knife and a concaved plate removably supported upon the huller-frame for carrying the portion of the cotton-seed passing outside the knife back toward the cylinder, substantially as described.

7. In a cotton-seed huller, the combination with a cylinder for carrying the cotton-seed, of a removable knife-holding casing forming a side of the huller-frame, a knife carried by the said casing, and means for holding the said casing in place on the huller comprising a break-bar engaged near its ends by the casing and having a groove formed about its central portion so as to weaken it at that point whereby upon a hard or foreign substance being forced between the huller-cylinder and the knife, the break-bar will give away and prevent harm to the knife, substantially as described.

8. In a cotton-seed huller, the combination with a main shaft, of a cylinder mounted thereon, the said cylinder being provided with radial grooves in its periphery, blades mounted in the said grooves, the said blades being supplied with double concaved surfaces forming ribs upon each side thereof, whereby the blades may be used with either edge out and the metal of the cylinder may be readily calked against the said ribs for holding the blades in place, substantially as described.

9. In a cotton-seed huller, the combination with a cylinder, of a knife adapted to receive and split the cotton-seed, a beater-plate mounted below said cylinder for further reducing the seed and a curved plate for returning the portion of the seed which passes outside the knife into the path of the cylinder and between it and the said beater-plate, substantially as described.

10. In a huller, the combination with a hulling mechanism, of a feed-trough, an endless belt mounted in said trough, a ratchet-wheel for operating the belt, a bent lever pivoted upon the shaft of the ratchet-wheel, a pawl pivoted to one end of said lever and engaging the ratchet-wheel, a cam for engaging the other end of the said bent lever upon one side thereof for actuating it and a screw for limiting and regulating the throw of the bent lever, so as to engage the cam during its complete revolution or for only a part of said revolution to actuate the feed more or less, substantially as described.

In testimony whereof I affix my signature in presence of two witnesses.

GEORGE W. SOULÉ.

Witnesses:
S. BOWMAN,
M. J. HENDERSON.